US012751356B2

(12) United States Patent
Kazi et al.

(10) Patent No.: US 12,751,356 B2
(45) Date of Patent: Oct. 6, 2026

(54) COMPACT STAND ON MOWER DECK BELT SYSTEM

(71) Applicant: DEERE & COMPANY, Moline, IL (US)

(72) Inventors: Mohseen V. Kazi, Pune (IN); Curtis D. Ayers, Willow Spring, NC (US)

(73) Assignee: Deere & Company, Moline, IL (US)

( * ) Notice: Subject to any disclaimer, the term of this patent is extended or adjusted under 35 U.S.C. 154(b) by 371 days.

(21) Appl. No.: 18/493,224

(22) Filed: Oct. 24, 2023

(65) Prior Publication Data

US 2025/0127082 A1 Apr. 24, 2025

(51) Int. Cl.

*A01D 34/74* (2006.01)
*A01D 34/68* (2006.01)
*A01D 34/76* (2006.01)
*A01D 34/66* (2006.01)
*A01D 101/00* (2006.01)

(52) U.S. Cl.

CPC ......... *A01D 34/6806* (2013.01); *A01D 34/74* (2013.01); *A01D 34/76* (2013.01); *A01D 34/662* (2013.01); *A01D 2101/00* (2013.01)

(58) Field of Classification Search

CPC ........ A01D 34/64; A01D 34/74; A01D 34/76; A01D 34/6806; A01D 34/662; A01D 2034/6837

See application file for complete search history.

(56) References Cited

U.S. PATENT DOCUMENTS 4,395,865 A * 8/1983 Davis, Jr ............. A01D 75/306 56/13.6
4,878,339 A * 11/1989 Marier ................... A01D 34/64 180/209
4,879,867 A * 11/1989 Wenzel .................. A01D 34/69 56/11.1
5,542,241 A * 8/1996 Lydy .................. A01D 34/6812 56/11.8
5,832,703 A * 11/1998 Evans ................ A01D 34/6806 474/166
6,155,033 A * 12/2000 Wians ................ A01D 34/6806 56/11.1
7,240,474 B2 * 7/2007 Buss .................... A01D 43/077 56/320.2

(Continued)

OTHER PUBLICATIONS

Hohnl EP 0623766 A1 Nov. 9, 1994 (Year: 1994).*

(Continued)

*Primary Examiner* — Alicia Torres

(57) ABSTRACT

A compact stand on mower deck belt system includes a first blade spindle and a second blade spindle rotatably mounted to a height adjustable mower deck under a stand on mower frame. An engine rigidly mounted to the stand on mower frame has a driveshaft over the mower deck. A first deck belt transmits rotational power from a driveshaft pulley to a pulley on one of the blade spindles on the mower deck. A second deck belt transmits rotational power between the pulleys on the blade spindles. At least one of an idler pulley and a tensioner pulley is rotatably mounted on the mower deck forwardly of the blade spindles and is engaged by the first deck belt. A maximum fleet angle of the first deck belt is between the driveshaft pulley and one of the idler pulley and the tensioner pulley.

9 Claims, 6 Drawing Sheets

(56) References Cited

U.S. PATENT DOCUMENTS

| | | | | |
|---|---|---|---|---|
| 7,427,247 | B2 | 9/2008 | Melone | |
| 7,596,934 | B2 * | 10/2009 | Waesche | A01D 69/00 56/11.9 |
| 10,306,833 | B2 | 6/2019 | Smith et al. | |
| 10,383,280 | B2 * | 8/2019 | Krause | A01D 43/077 |
| 11,178,815 | B1 | 11/2021 | Crowl et al. | |
| 11,758,843 | B2 * | 9/2023 | Fergus | A01D 34/76 56/11.6 |

OTHER PUBLICATIONS

Ferris Operators Manual-SRS Z1 Series Zero-Turn Riding Mower, pp. 1-48.

Ferris Parts Manual-SRS Z1 Series Mower Deck, Oct. 6, 2023, pp. 1-57.

Grasshopper Mowers—The Original Zero Turn Mowers, Model SO26, pp. 1-9, [online], [retrieved on Oct. 6, 2023]. Retrieved from the Internet <URL: https://www.grasshoppermower.com/mowers/midmount/stand-on/?series=MidMount&model=stand-on/>.

Vertex S-Series 48, 52, and 60-inch Stand-On Mowers, pp. 1-7, [online], [retrieved on Oct. 6, 2023]. Retrieved from the Internet <URL: https://www.exmark.com/products/mowers/stand-on/vertex/vertex-s-series>.

* cited by examiner

COMPACT STAND ON MOWER DECK BELT SYSTEM

FIELD OF THE INVENTION

This invention relates generally to stand on mowers, and specifically to a compact stand on mower deck belt system.

BACKGROUND OF THE INVENTION

Stand on mowers are used for commercial and residential mowing. Like zero turning radius mowers, they have a pair of independently driven rear traction drive wheels controlled by a pair of steering levers. Compact stand on mowers may have mower decks under 40 inches in width to fit through gates, tight openings, around trees or obstacles. These mower decks have two rotary blades. Compact stand on mowers also may have a short length to minimize storage space on trailers, sheds or garages, and may be relatively light in weight. Compact stand on mowers may have an engine mounted rigidly to the vehicle frame in front of the operator station and over the mower deck. The angle of the belt that transmits power from the engine to the mower deck may be referred to as the fleet angle which may increase when the mower deck is raised or lowered, because the engine is close to the mower deck.

There is a need for an improved compact stand on mower deck belt system that extends belt life by having a low fleet angle. There is a need for an improved compact stand on mower deck belt system that lowers belt stress, provides cooler running belts, and reduces belt friction and dislodgement from pulleys.

SUMMARY OF THE INVENTION

A compact stand on mower deck belt system includes an engine driveshaft extending downwardly over a rear portion of a mower deck with an engine driveshaft pulley attached thereto. A first deck belt engages the engine driveshaft pulley and a first blade spindle pulley. A second deck belt engages the first blade spindle pulley and a second blade spindle pulley. At least one of an idler pulley and a tensioner pulley is mounted to a front portion of the mower deck and engages the first deck belt between the engine driveshaft pulley and the first blade spindle pulley. This provides a reduced fleet angle for a two deck belt system on a stand on mower.

DESCRIPTION OF THE PREFERRED EMBODIMENT

Figure 1:
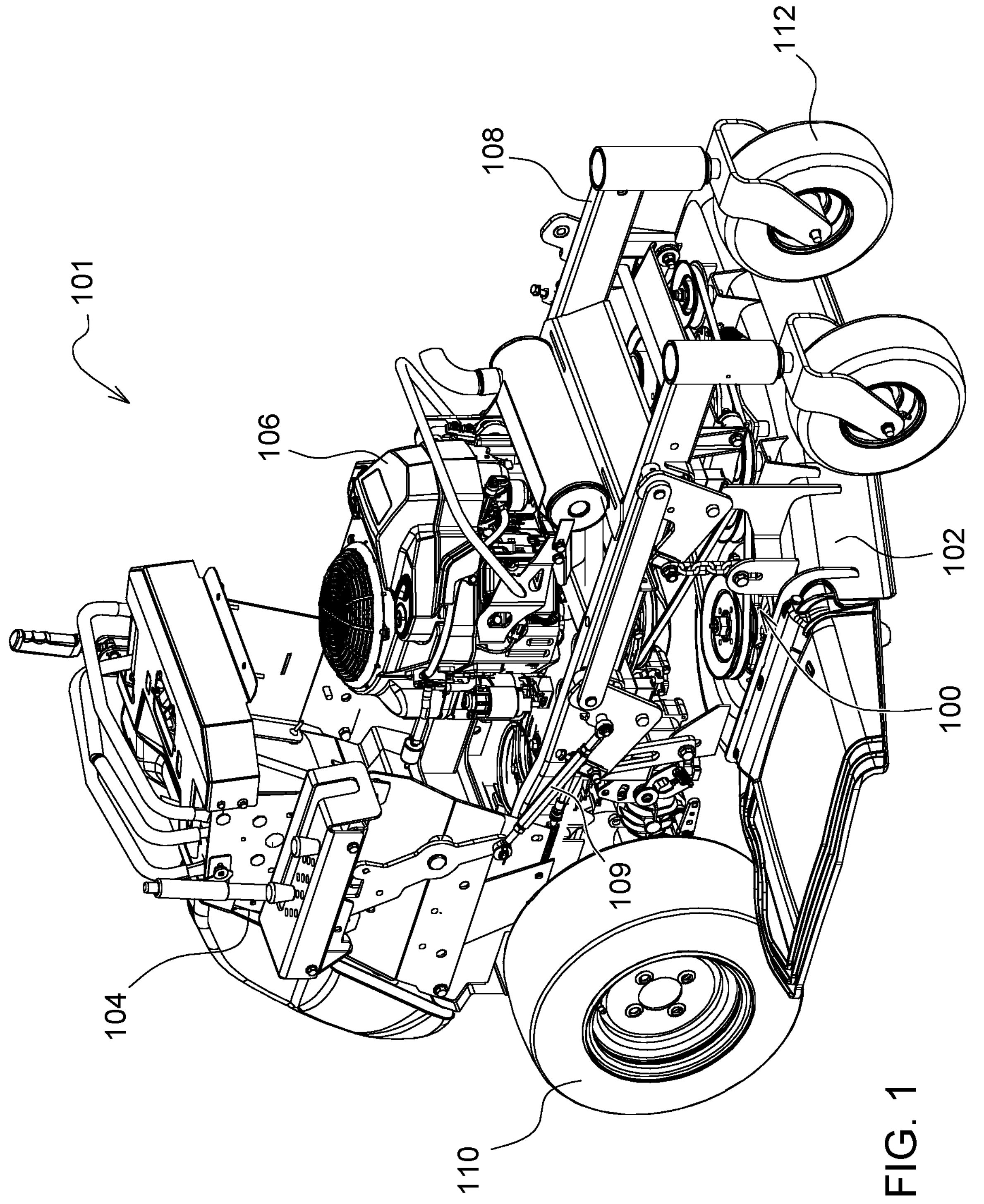
FIG. 1 is a perspective view of a stand on mower with a deck belt system according to a first embodiment of the invention.
Figure 2:
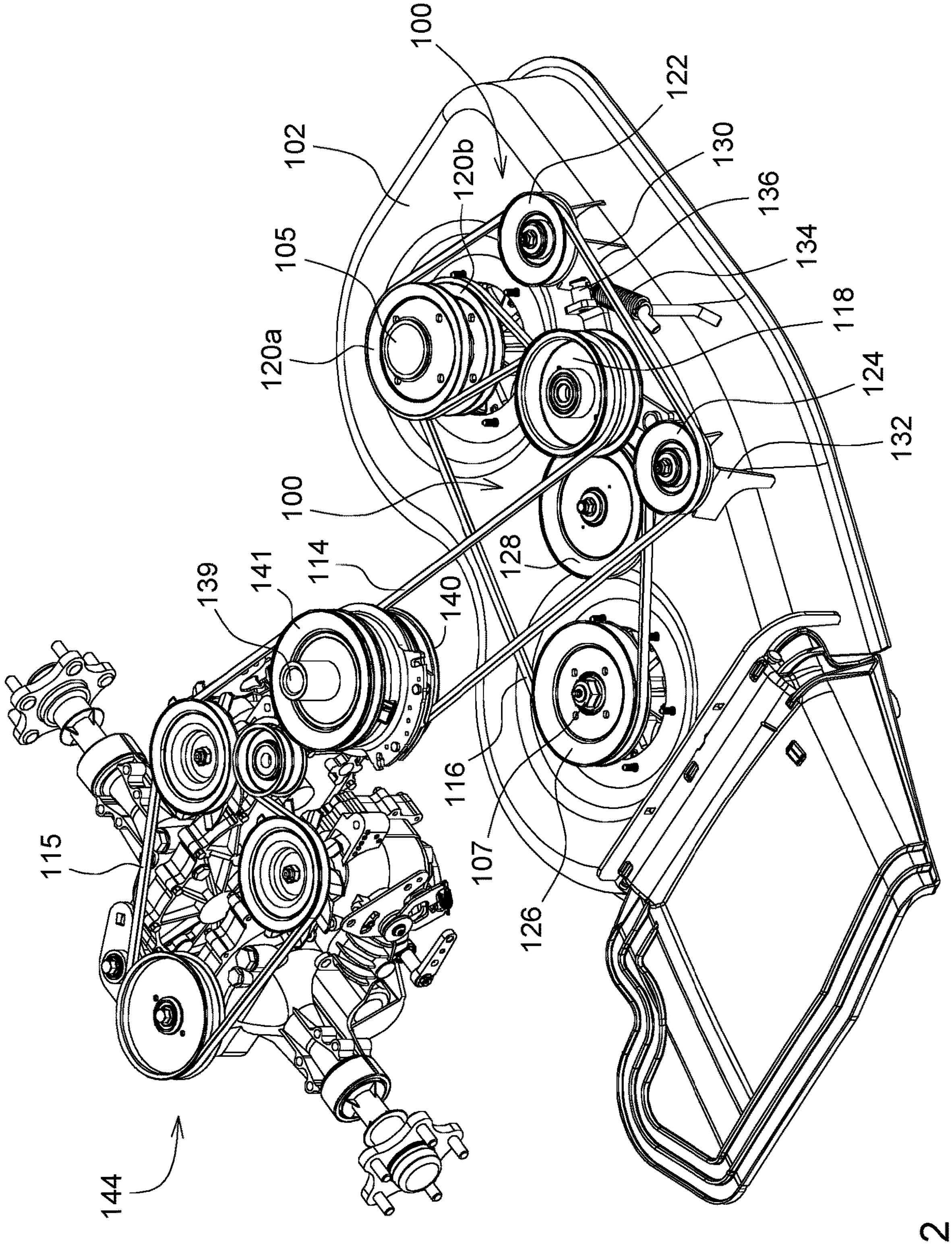
FIG. 2 is a perspective view of a stand on mower deck belt system according to a first embodiment of the invention.
Figure 3:
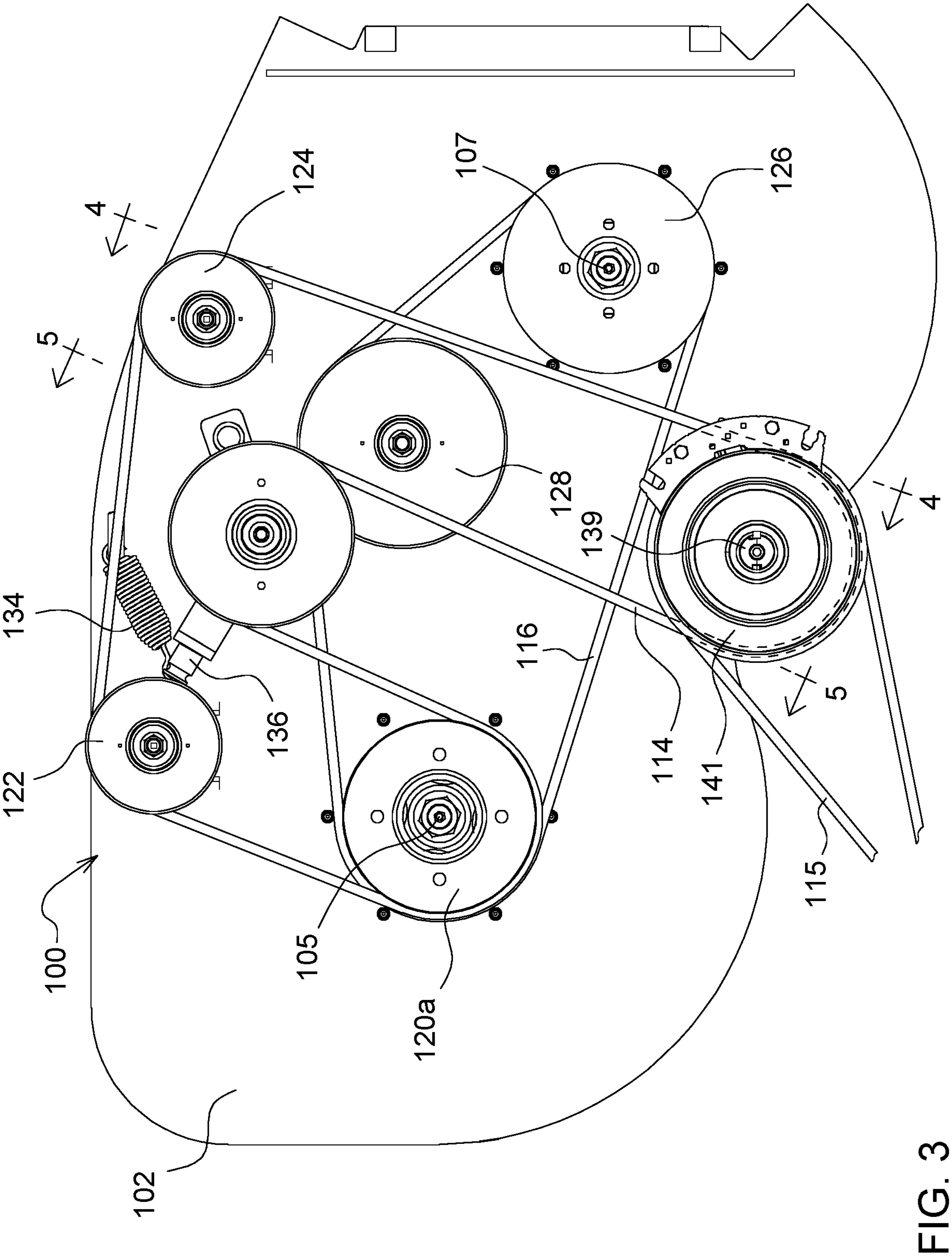
FIG. 3 is a top view of a sand on mower deck belt system according to a first embodiment of the invention.

In one embodiment shown in FIGS. 1-6, compact stand on mower deck belt system 100 may be on compact stand on mower 101 having floating mower deck 102, operator station 104, and internal combustion engine 106 or other power source. The engine or other power source may be stationary or mounted rigidly to the compact stand on frame 108 in front of the operator station, and above mower deck 102. Front caster wheels 112 may support the forward end of frame 108. Mower deck 102 may have two blade spindles 105, 107 mounted thereto, with a rotary cutting blade attached to the lower end of each spindle. Mower deck 102 may have a width of 40 inches or less for fitting through gates, tight openings, around trees or obstacles. Lift system 109 may be used to raise or lower mower deck 102 between cutting heights of about 1.5 inches and about 5 inches.

In one embodiment shown in FIGS. 1-6, compact stand on mower deck belt system 100 may have first and second deck belts 114, 116. First deck belt 114 may transmit rotational power from pulley 140 on engine driveshaft 139 to pulley 120*a* on left blade spindle 105. Second deck belt 116 may transmit rotational power between pulley 120*a* on left blade spindle 105 and pulley 126 on right blade spindle 107. Each deck belt preferably may be a V-belt for engaging a V-groove in each pulley or sheave.

In one embodiment shown in FIGS. 1-6, compact stand on mower deck belt system 100 may include first deck belt 114 between driveshaft pulley 140 and first idler pulley 124 on mower deck 102. Engine driveshaft 139 and driveshaft pulleys 140, 141 may be located over the rear portion of the mower deck. First idler pulley 124 may be rotatably mounted on bracket 132 attached to the top surface of the mower deck adjacent the front center of the mower deck.

In one embodiment shown in FIGS. 1-6, compact stand on mower deck belt system 100 may include first deck belt 114 extending between first idler pulley 124 and second idler pulley 122. The first and second idler pulleys may be rotatably mounted to the front portion of mower deck 102, so that both idler pulleys are over the mower deck. Second idler pulley 122 may be rotatably mounted on bracket 132 attached to the top surface of the mower deck.

In one embodiment shown in FIGS. 1-6, compact stand on mower deck belt system 100 may include first deck belt 114 extending between second idler pulley 122 and upper pulley or sheave 120*a* on left blade spindle 105. The left blade spindle may be mounted to the mower deck rearward of the second idler pulley. Upper pulley or sheave 120*a* may be spaced above lower pulley or sheave 120*b* on left blade spindle 105. The left blade spindle may extend through the mower deck where a rotary mower blade may be attached thereto.

In one embodiment shown in FIGS. 1-6, compact stand on mower deck belt system 100 may include first deck belt 114 extending between upper pulley or sheave 120*a* on left blade spindle 105, and tensioner pulley 118. The tensioner pulley may be rotatably mounted on tensioner arm 136. Tensioner arm 136 may be pivotably mounted to the top front surface of the mower deck, forwardly of the left blade spindle and between the left and right idler pulleys. Tensioner spring 134 may tension first deck belt 114 by biasing tensioner arm 136 toward the front of the mower deck and tensioner pulley 118 against the back side of the first deck belt. Tensioner pulley 118 may have a flat width such as 2 inches so the back side of first deck belt 114 may ride up or down on the tensioner pulley.

In one embodiment shown in FIGS. 1-6, compact stand on mower deck belt system 100 provides a two belt system with a reduced fleet angle of the belt between the engine driveshaft and mower deck. For example, first deck belt 114 has a maximum fleet angle of less than about 7 degrees. The maximum fleet angle may be measured between drive pulley 140 and a pulley mounted to the mower deck. In this compact stand on mower deck belt system, the maximum fleet angle is between drive pulley 140 and tensioner pulley 118 or first idler pulley 124. The maximum fleet angle may be when the mower deck is raised to its lowest height of cut, such as 1.5 inches, or raised to its highest height of cut, such as 5.0 inches. The minimum fleet angle may be 0 degrees at an intermediate height of cut, such as 3.25 inches, where the drive pulley is at the same height as the tensioner pulley and first idler pulley.

Figure 4:
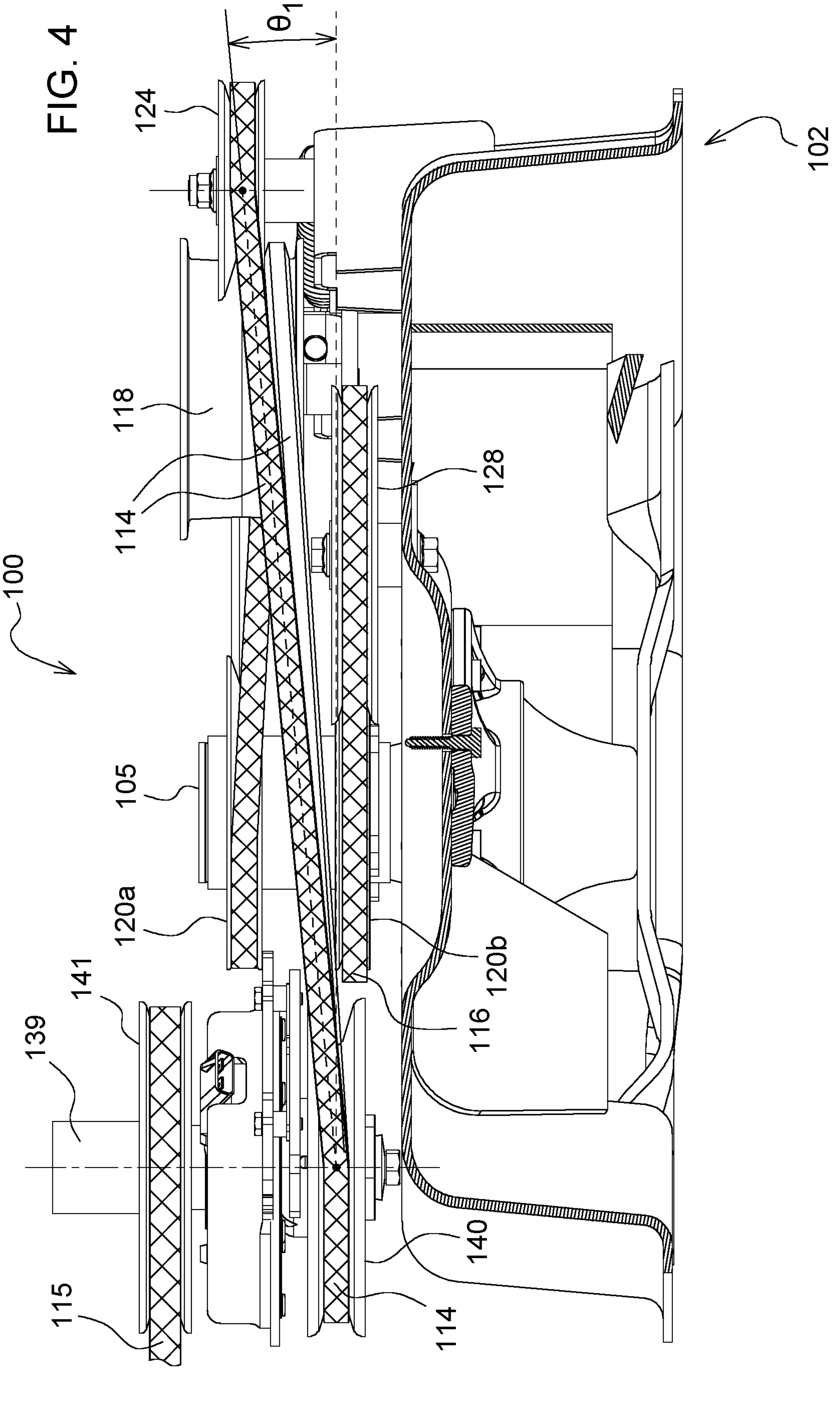
FIG. 4 is side view, partially in cross section, of a stand on mower deck belt system at the lowest cutting height, according to a first embodiment of the invention.

In one embodiment shown in FIG. 4, compact stand on mower deck belt system 100 may have a maximum fleet angle $\Theta_1$ of 5.48 degrees at the mower deck's highest height of cut setting of 5.0 inches. The fleet angle at the highest height of cut setting of 5.0 inches is based on first idler pulley 124 that is raised to 1.75 inches (44.45 mm) above drive pulley 140, and a belt length between the first idler pulley and drive pulley of 18.2 inches (463 mm). This results in a fleet angle of 5.48 degrees.

Figure 5:
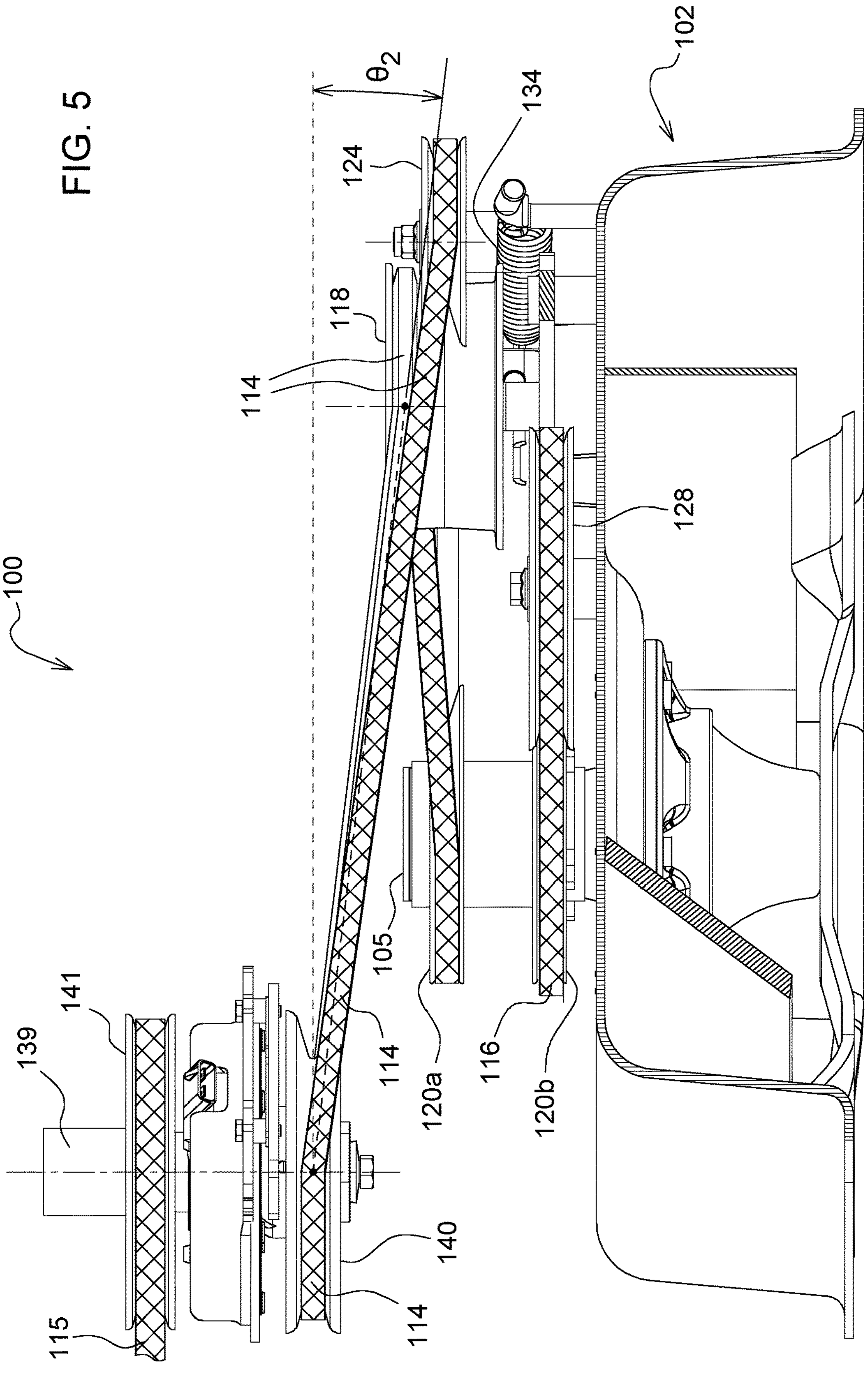
FIG. 5 is a side view, partially in cross section, of a stand on mower deck belt system at the highest cutting height, according to a first embodiment of the invention.

In one embodiment shown in FIG. 5, compact stand on mower deck belt system 100 may have a maximum fleet angle $\Theta_2$ of 6.86 degrees at the mower deck's lowest height of cut setting of 1.5 inches. The fleet angle at the lowest height of cut setting of 1.5 inches is based on tensioner pulley 118 that is lowered to 1.75 inches (44.45 mm) below drive pulley 140, and a belt length between the tensioner pulley and drive pulley of 14.5 inches (369 mm). This results in a fleet angle of 6.86 degrees. The fleet angle may be reduced to 4.95 degrees at the lowest height of cut if tensioner pulley 118 has a width of at least 2 inches as shown in FIG. 5.

Figure 6:
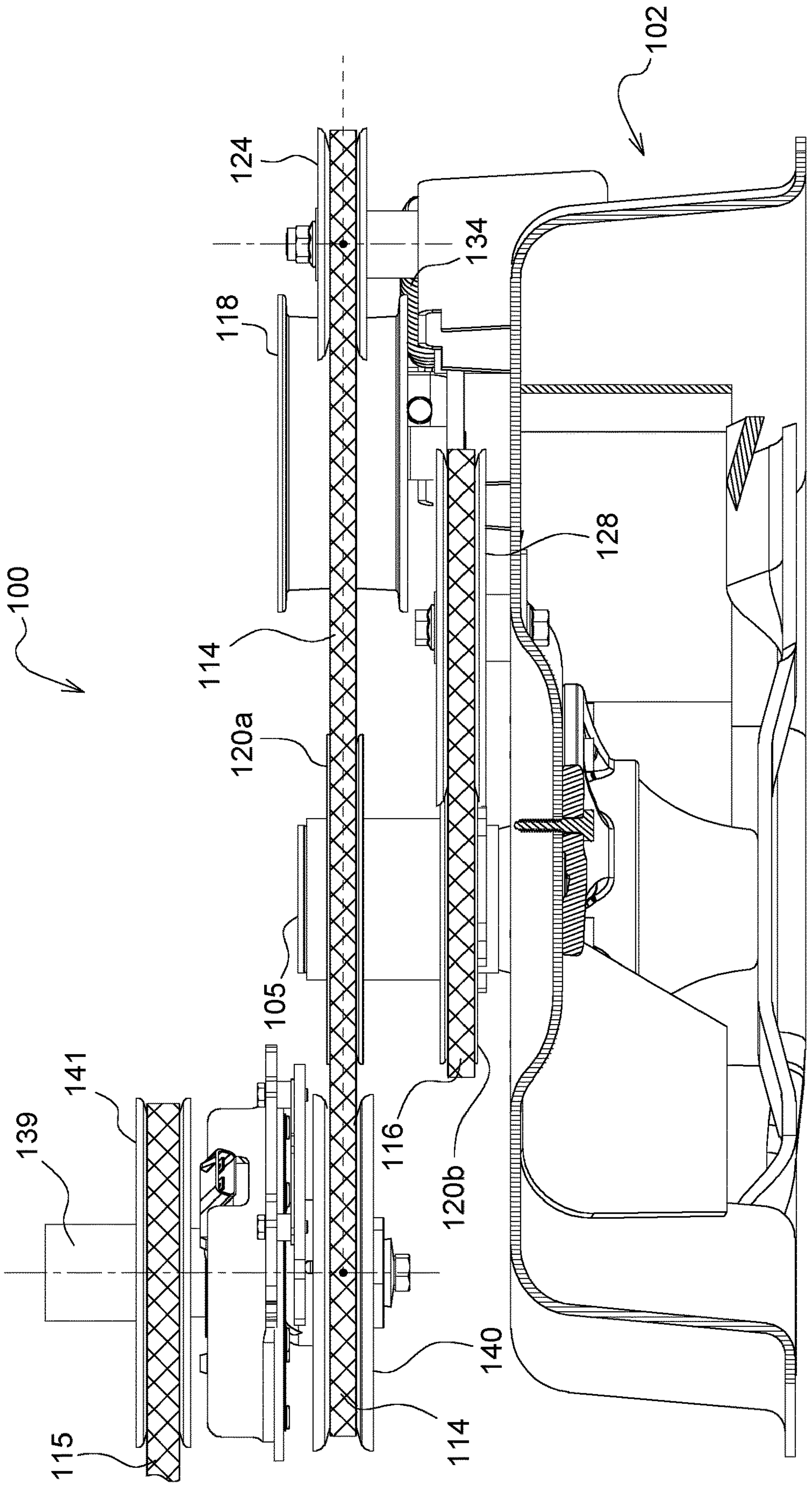
FIG. 6 is a side view, partially in cross section, of a stand on mower deck belt system at an intermediate cutting height between the lowest and highest cutting heights, according to a first embodiment of the invention

In one embodiment shown in FIG. 6, compact stand on mower deck belt system 100 may have a fleet angle of 0 degrees at an intermediate cutting height between the mower deck's highest and lowest height of cut settings. At the intermediate cutting height, tensioner pulley 118 and first idler pulley 124 are at the same height as drive pulley 140.

In one embodiment shown in FIGS. 1-6, compact stand on mower deck belt system 100 may include second deck belt 116 which may transmit rotational power from left blade spindle 105 to right blade spindle 107. Second deck belt 116 may extend between lower pulley or sheave 120*b* on left blade spindle 105, and pulley or sheave 126 on right blade spindle 107. The right blade spindle may extend through the mower deck where a rotary mower blade may be attached thereto. Second deck belt 116 also may engage idler pulley 128 rotatably mounted on the mower deck between and forward of the left and right blade spindles. The compact stand on mower deck belt system may include a first mounting hole and a second mounting hole for idler pulley 128, for repositioning the idler pulley to increase tension of the second deck belt after extended use.

In one embodiment shown in FIGS. 1-6, compact stand on mower deck belt system also may include a third belt 115 to transmit rotational power from a second pulley or sheave 141 on engine driveshaft 139 to integrated hydrostatic transaxle 144 for left and right rear traction drive wheels 110.

Having described the preferred embodiments, it will become apparent that various modifications can be made without departing from the scope of the invention as defined in the accompanying claims.

The invention claimed is:

1. A compact stand on mower deck belt system, comprising:

a stand on mower having an engine rigidly mounted to a frame of the stand on mower over a mower deck having a lift system to raise or lower the mower deck to a plurality of height of cut positions;

a first deck belt engaging a drive pulley on a driveshaft of the engine, a plurality of first deck belt idler pulleys rotatably mounted to the front of the mower deck, an upper pulley on a first blade spindle, and a tensioner pulley;

a second deck belt below the first deck belt, engaging a lower pulley on the first blade spindle, a pulley on a second blade spindle, and at least one second deck belt idler pulley; wherein the first deck belt has a maximum fleet angle of less than 7 degrees.

2. The compact stand on mower deck belt system of claim 1 wherein the tensioner pulley engages a back side of the first deck belt.

3. The compact stand on mower deck belt system of claim 1 further comprising a third belt on a second pulley on the engine driveshaft to an integrated hydrostatic transaxle.

4. The compact stand on mower deck belt system of claim 1 wherein the tensioner pulley is mounted to a tensioner arm biased forwardly to urge the tensioner pulley between said plurality of first deck belt idler pulleys.

5. A compact stand on mower deck belt system, comprising:

an engine driveshaft extending downwardly over a rear portion of a mower deck and having an engine driveshaft pulley attached thereto;

a first deck belt engaging the engine driveshaft pulley and a first blade spindle pulley;

a second deck belt engaging the first blade spindle pulley and a second blade spindle pulley; and a plurality of idler pulleys and a tensioner pulley mounted to a front portion of the mower deck and engaging the first deck belt between the engine driveshaft pulley and the first blade spindle pulley.

6. The compact stand on mower deck belt system of claim 5 further comprising a third belt engaging a second engine driveshaft pulley and an integrated hydrostatic transmission.

7. A compact stand on mower deck belt system, comprising:

a first blade spindle and a second blade spindle rotatably mounted to a height adjustable mower deck under a stand on mower frame;

an engine rigidly mounted to the stand on mower frame and having a driveshaft over the mower deck;

a first deck belt transmitting rotational power from a driveshaft pulley to a pulley on one of the first and second blade spindles on the mower deck;

a second deck belt transmitting rotational power between the pulleys on the first and second blade spindles;

a plurality of idler pulleys and a tensioner pulley rotatably mounted on the mower deck forwardly of the first and second blade spindles and engaged by the first deck belt;

whereby a maximum fleet angle of the first deck belt is between the driveshaft pulley and one of the idler pulley and the tensioner pulley.

8. The compact stand on mower deck belt system of claim 7 wherein a maximum fleet angle of the first deck belt is between the driveshaft pulley and an idler pulley at a highest height of cut.

9. The compact stand on mower deck belt system of claim 7 wherein a maximum fleet angle of the first deck belt is between the driveshaft pulley and a tensioner pulley at a lowest height of cut.

* * * * *